United States Patent [19]

Takahashi et al.

[11] Patent Number: 5,275,842
[45] Date of Patent: Jan. 4, 1994

[54] METHOD FOR PRODUCING MAGNETIC RECORDING MEDIUM

[75] Inventors: Shinsuke Takahashi; Norio Shibata, both of Kanagawa, Japan

[73] Assignee: Fuji Photo Film Co., Ltd., Kanagawa, Japan

[21] Appl. No.: 45,182

[22] Filed: Apr. 13, 1993

[30] Foreign Application Priority Data

Apr. 30, 1992 [JP] Japan .................................. 4-135565

[51] Int. Cl.$^5$ ................................................ B05D 5/12
[52] U.S. Cl. .................................... 427/130; 427/131; 427/265; 427/393.3; 427/434.2
[58] Field of Search ....................... 427/131, 258, 430.1, 427/407.1, 130, 385.5, 434.2, 393.3

Primary Examiner—Bernard Pianalto
Attorney, Agent, or Firm—Sughrue, Mion, Zinn, Macpeak & Seas

[57] ABSTRACT

A method for producing a magnetic recording medium wherein an undercoating layer is provided before forming a magnetic layer by applying a coating composition onto a surface of a continuously traveling flexible support, excluding widthwise-direction edge portions of the support, and pressing the support to a forward end of a slot of a coating head. At least one part of the undercoating layer is formed by preliminarily applying a high-molecular solution having a glass transition point of higher than the heat treatment temperature onto at least the edge portions of the flexible support to give a larger width to the undercoating layer than the width of the magnetic coating layer.

4 Claims, 1 Drawing Sheet

METHOD FOR PRODUCING MAGNETIC RECORDING MEDIUM

BACKGROUND OF THE INVENTION

The present invention relates to a method for producing a magnetic recording medium by applying coating compositions, such as a magnetic solution, a surface protecting solution, and so on, onto a flexible support formed of plastic film, paper, metal or the like.

A roll coating method, a bead coating method, a curtain coating method, an extrusion coating method, and so on, are known coating methods for applying a coating composition onto a flexible support (hereinafter referred to as "web"). In any one of the above-mentioned coating methods, the width of a portion of the web to which the coating composition is applied is narrower than the total width of the web, so that uncoated portions having a width in a range from several millimeters to tens of millimeters remain as edge portions on both sides of the web in the direction of the width of the web.

As seen in extrusion coaters disclosed in Japanese Patent Unexamined Publications Nos. Sho. 57-84771, Sho. 58-104666, Sho. 58-109162, Sho. 58-18069, Sho. 58-18070 and Sho. 60-78664, Japanese Patent Applications Laid-Open Nos. Sho. 59-94657 and Sho. 61-230173, Japanese Patent Examined Publication No. Sho. 49-1459, and so on, when the coating composition is applied onto a continuously traveling web while a coating head is being urged against the web, the tense web is bent at the widthwise edge portions so as to be warped toward the coating head to come into contact with the coating head.

As a result of contact with the coating head, the web is cut so that powder-like shavings are produced. The shavings tend to scatter, resulting in the failure of accurate detection of the recorded signals during reproduction. In addition, shavings deposited onto the contact portion of the coating head change the distance between the web and the coating head so that the thickness of the coating composition becomes uneven at the edge portions, reducing the quality of the coating.

It is known that the same effect as that of the coating head can be provided by a doctor bar or a smoother, as disclosed in Japanese Patent Unexamined Publications Nos. Sho. 51-140703, Sho. 52-84242 and Sho. 54-8646, Japanese Patent Publications Nos. Sho. 48-11336 and Sho. 60-53674.

To solve the above problems, therefore, there has been proposed a method in which a portion between the web and the coating head is lubricated with a liquid by preliminarily applying a solvent onto edge portions of the web where the coating composition is not applied, before applying the coating composition onto the web, for example, as disclosed in Japanese Patent Unexamined Publications Nos. Sho. 61-257268 and Hei. 1-102736.

On the other hand, there has been proposed a method in which portions of the coating head or the like corresponding to the edge portions are notched to increase the distance between the coating head and the web, for example, as disclosed in Japanese Patent Unexamined Publication No. Sho. 61-257263.

Furthermore, there has been proposed a method for use with extrusion coating where a suitable lubricating material, such as polymer, monomer, UV resin, or the like, is applied at least to the lug portion of the web to counter lug cutting in the extrusion coating method, for example as described in Japanese Patent Unexamined Publication No. Hei. 3-116524. That is, for the purpose of preventing the web from cutting, a force urging the extruder blade edge to come into contact with the web at the time of coating of the magnetic coating composition is decreased by applying a material, such as fluorine lubricant, polymer, monomer, UV resin, or the like, at least to the lug portion of the web in the direction of width of the web, and then drying the material. The problem of cutting can be solved very effectively by this method.

According to this method, however, the material, such as polymer or the like, applied to the lug portion remains exposed on a surface of the web after drying. This causes problems in subsequent processing steps.

After coating, the magnetic recording medium is subjected to calendering and then subjected to a heat treatment while being rolled for the dual purpose of hardening the resulting film and removing the thermal stress of the web. Here, the film of polymer or the like applied to the lug portion and exposed on the outside edge portions of the magnetic layer on the web is softened or dissolved so as to adhere to the back of the web. Hence, the surface of coating in the vicinity of the web lug portion is separated from the web surface. Particularly in recent years, thinner webs have been used to provide a thin magnetic recording medium. However, the adhesion of the dissolved polymer or the like to the back of the web creates difficulties in web cutting.

SUMMARY OF THE INVENTION

In order to solve the above-mentioned problems, it is an object of the present invention to provide a method of coating a web in which not only the difficulty of cutting a lug portion of the web is eliminated, but also the problem of adhesion or the like is prevented even in the heat treatment performed during subsequent processing, in extrusion coating of a magnetic recording medium.

The aforementioned object of the present invention can be achieved by a method for producing a magnetic recording medium which includes providing an undercoating layer before forming a magnetic layer by applying a coating composition onto a surface of a continuously traveling web excluding the widthwise edge portions of the surface of the web, while pressing the web against a forward end of a slot of a coating head, characterized in that a high-molecular solution having a glass transition point ($T_g$) of higher than the heat treatment temperature is applied in advance onto portions corresponding to at least the edge portions of the web in a coating width wider than the magnetic coating layer, and then the high-molecular solution is dried to thereby form at least part of the undercoating layer.

BRIEF DESCRIPTION OF THE DRAWINGS

The present invention will be described with reference to the accompanying drawings, wherein.

DESCRIPTION OF THE PREFERRED EMBODIMENT

A preferred embodiment of a coating apparatus for use with the method of the present invention will be described with reference to the drawings.

Figure 2:
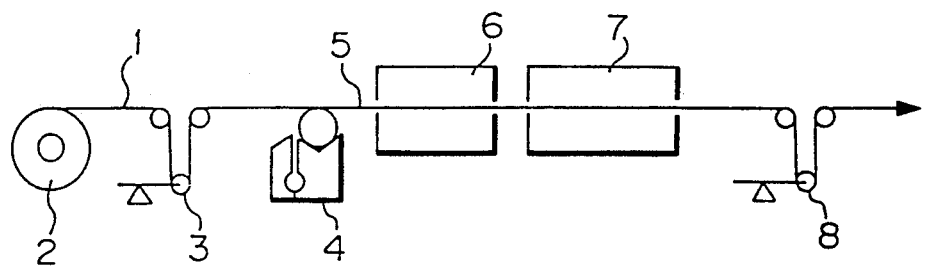
FIG. 2 is a schematic block diagram of producing equipment to which the magnetic recording medium producing method according to the present invention is applied.

FIG. 2 is a schematic block diagram of magnetic recording medium producing equipment to which the producing method of the present invention is applied. As illustrated in FIG. 2, a continuously traveling web 1 is fed from a delivery roller 2 to a coating portion 4 for receiving an undercoating layer 5, while suitable tension is maintained on the web 1 through tension rollers 3. The undercoating layer 5 is applied to the web 1 in the direction of width of the web 1, except in the area defined by the edge portions 9 (see FIG. 3), so that the width of the undercoating layer 5 is narrower than the width of a magnetic layer 20. Protective undercoating layers 13 are then formed by applying a high-molecular solution having a glass transition point ($T_g$) of higher than the heat treatment (hardening treatment of the synthetic resin) temperature onto the edge portions 9 at an edge portion treating zone 6 described later. The width of the sum of the two protective undercoating layers 13 and the undercoating layer 5 is larger than the width of the magnetic layer 20. For example, a solution of an organic solvent such as polyester resin or polyurethane resin may be used as the coating composition for forming the undercoating layer 5. A solution of polyester resin may be used as the high-molecular solution for forming the protective undercoating layers 13. The polyester resin is synthesized from an alcohol component and a dibasic acid. The alcohol component is selected from ethylene glycol, diethylene glycol, triethylene glycol, tetraethylene glycol, and so on. The dibasic acid may contain some polar group by using a mixture of an aromatic dicarboxylic acid, such as an ortho-terephthalic acid, an isoterephthalic acid, a terephthalic acid, or the like, and a polar group-containing phthalic acid.

An example of the polar group is selected from $-SO_3M$, $-OSO_3M$, $-COOM$ and $-OPO_3M_2$ (in which M represents a hydrogen atom, an alkali metal atom or an ammonium salt; where two M atoms are provided, it is not required that they be the same type of atom).

Another example of the high-molecular solution used in the present invention is a solution of polyurethane resin which is synthesized by a reaction between a polyisocyanate compound and a polyol component. Polyester-polyol obtained by a reaction between polyol and polybasic acid may be used as the polyol component. The polyurethane resin may be obtained by a reaction between a polyisocyanate compound and polyester-polyol having some polar group introduced therein by using polybasic acid having some polar group or polyol having some polar group as a part of the polybasic acid or a part of the polyol.

Examples of the polybasic acid having some polar group and the polyol having some polar group include a 5-sulfoisophthalic acid, a 2-sulfoisophthalic acid, a 4-sulfophthalic acid, a 3-sulfophthalic acid, 5-sulfoisophthalic acid dialkyl, 2-sulfophthalic acid dialkyl, 4-sulfophthalic acid alkyl, 3-sulfophthalic acid alkyl, sodium salts thereof, potassium salts thereof, a dimethylolpropionic acid, sodium salts thereof, and potassium salts thereof. In either of the polyester resin and the polyurethane resin, the amount of the polar group is preferably in a range from 0.1 meq/g to 3 meq/g, inclusively. The molecular weight is preferably in a range from 10,000 to 100,000, more preferably from 30,000 to 60,000, as weight-average molecular weight. If the amount of the polar group or the molecular weight is too high, solubility in solvent is deteriorated undesirably. The glass transition point ($T_g$) can be controlled by the proportion of the alcohol component and the dibasic acid component, so that the glass transition point ($T_g$) can be adjusted in a range from 40° C. to 80° C. If the glass transition point ($T_g$) is too low, blocking may occur during the production process.

The protective undercoating layers 13 may be applied onto a substantial total width of the web 1 at the coating portion 4 or may be applied to the web at the portions to which the coating composition is not applied during subsequent processing, as in this embodiment. Further, the undercoating layer 5 may be omitted entirely so that all functions can be fulfilled by the undercoating layers 13.

After the undercoating layer 5 is applied, the web 1 is sent to an edge portion treating zone 6 in which the protective undercoating layers 13 are formed. After the protective undercoating layers 13 are formed, the web 1 is further sent to an undercoating layer drying zone 7 in which the undercoating layer 5 and the protective undercoating layers 13 are dried. Thereafter, after passing through a conveyance system constituted by suitable tension rollers 8 and so on, a magnetic dispersion solution is applied to the web.

Figure 3:
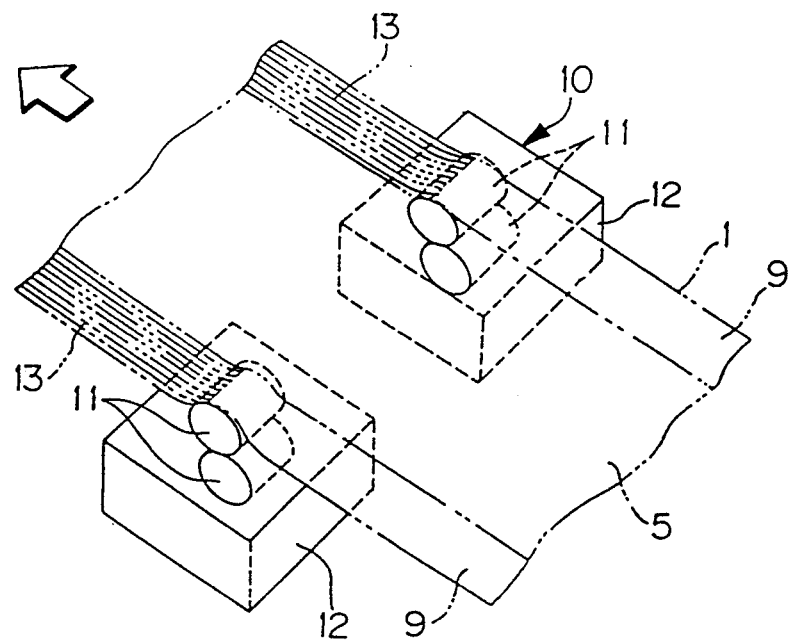
FIG. 3 is a perspective view showing the high-molecular solution applying step in the producing method according to the present invention.

FIG. 3 is a perspective view of a coating device 10 constituting the edge portion treating zone 6. The coating device 10 has a structure in which two reverse rollers 11 are provided in each of the coating composition pans 12 arranged to correspond to the edge portions 9 (portions substantially equivalent to portions free from the magnetic dispersion solution) on opposite sides of the web 1. In such a structure, a high-molecular solution having a glass transition point ($T_g$) of higher than the heat treatment temperature, for example, contained in the coating composition pans 12 is applied to the edge portions 9 of the web 1 by rotation of the reverse rollers 11. In applying the high-molecular solution, it is preferable that the outermost ends of the coating portion be set slightly inside the respective side edges of the web 1 to thereby prevent the solution from flowing around to the back of the web 1.

A polyethylene terephthalate film (PET base) containing a filler ($CaCO_3$, $TiO_2$) is generally used for a web 1 of a VTR magnetic recording medium. The filler is added for the purpose of giving slight roughness to the back of the web to reduce contact resistance at contact portions, such as guide balls and so on, of a magnetic recording/reproducing apparatus to thereby attain stability of tape travel. Shavings deposited on a coating head or the like contain the filler as a main constituent.

When the high-molecular solution is constituted by a material having a glass transition point ($T_g$) of higher than the heat treatment temperature as described above, the phenomenon of adhesion between parts of the web can be avoided because the protective layers exposed on the edge portions of the magnetic layer are not dissolved, even in the case where the web is in a rolled state and is subjected to heat treatment (for example, 65°

C. for 24 hours, 60° C. for 24 hours, 55° C. for 48 hours) for the dual purpose of hardening the film and removing the thermal stress of the web after the coating of the magnetic dispersion solution.

Furthermore, the undercoating layers 13 formed at the edge portions 9 of the web 1 according to the present invention are highly durable and possess excellent lubricating properties. As a result, the extrusion coating head for applying the magnetic dispersion solution can be prevented from contacting the edge portions, and the smoother can be prevented from unnecessarily contacting the edge portions 9 of the web. Accordingly, not only are the shavings effectively prevented from being produced at the edge portions 9, but the falling of the filler can also be avoided, so that the dropout can be reduced. Furthermore, because the protective undercoating layers 13 are so highly lubricative, the frictional resistance of the edge portions 9 of the web is reduced and an improved traveling characteristic of the web is attained.

In the embodiment described herein, it is not necessary to place the edge portion treating zone 6 after the coating portion 4 for undercoating layer 5, as shown in FIG. 2. The end portion treating zone 6 can be positioned before the coating portion 4. If the high-molecular solution is applied to a desired width at the coating portion 4 as described above, it is no longer necessary to use the end portion treating zone 6. The formation of the undercoating layer need not be performed during the process for applying the magnetic dispersion solution as shown in FIG. 2, but may be performed in the process for producing the web before the process of applying the magnetic dispersion solution.

It is a matter of course that the coating device for realizing the method of the present invention is not limited to the apparatus illustrated in FIGS. 2 and 3, and that any one of various coating devices known conventionally may be used.

As described above, according to the present invention, protective layers of a high-molecular solution which are already dried at the time of coating of a magnetic dispersion solution are formed on edge portions of a web which are not to be coated with the dispersion solution, before the magnetic dispersion solution is applied to the web. Accordingly, not only is the extrusion coating head for applying the magnetic dispersion solution prevented from contacting the edge portions, but the magnetic dispersion solution is prevented from oozing out. In addition, the smoother is prevented from unnecessarily contacting the edge portions of the web. Therefore, shavings are effectively prevented from being produced at the edge portions. In addition to this effect, the phenomenon of adhesion between parts of the web is avoided because the high-molecular solution is constituted by a material having a glass transition point ($T_g$) of higher than the heat treatment temperature. That is, adhesion is avoided because the protective layers exposed on the edge portions of the magnetic layer are not dissolved, even in the case where the web is in a rolled state and is subjected to heat treatment for the double purpose of hardening the film and removing the thermal stress of the web after the coating of the magnetic dispersion solution.

EXAMPLE

The effect of the magnetic recording medium producing method according to the present invention will become clearer from the following example.

In this example, respective constituent components were sufficiently mixed and dispersed in a ball mill. Thirty parts by weight of epoxy resin (epoxy equivalent: 500) were added to the resulting mixture and mixed uniformly to prepare a magnetic dispersion solution. The composition thereof will be described hereinbelow.

TABLE 1

| | |
|---|---|
| γ-$FeO_3$ powder (needle-shaped particles with a longitudinal mean particle size of 0.5 μm and a coercive force of 320 Oe | 300 parts by weight |
| Vinyl chloride-vinyl acetate copolymer (copolymerization ratio 87:13, polymerization degree 400) | 30 parts by weight |
| Electrically conductive carbon | 20 parts by weight |
| Polyamide resin (amine value 300) | 15 parts by weight |
| Lecithin | 6 parts by weight |
| Silicone oil (dimethyl polysiloxane) | 3 parts by weight |
| Xylole | 300 parts by weight |
| Methyl isobutyl ketone | 300 parts by weight |
| n-butanol | 100 parts by weight |

A coating apparatus and coating conditions used in the method of the present invention will be further described below.

Web Material: polyethylene terephthalate
Thickness: 9 μm
Coating Speed: 600 m per minute
Tension: 20 kg/m
Coating Thickness: 3.0 μm (dry thickness) (which corresponds to coverage of 15 cc/m$^2$)

Extruder (Extrusion Coating Head)

Figure 1:
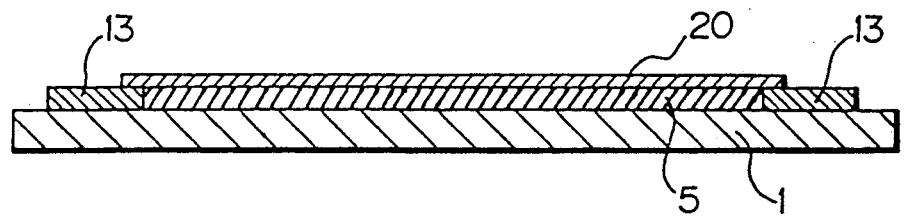
FIG. 1 is a cross-sectional view of a magnetic recording medium produced by a magnetic recording medium producing method according to the present invention.

Coating Width: 500 mm
Slit Gap: 0.3 mm
Slit Length: liquid supply side 80 mm opposite side 77 mm
Liquid Reservoir Inner Diameter: 15 mm Before the coating of the aforementioned magnetic dispersion solution, an undercoating composition was applied to substantially the whole width of the web at the coating portion 4, as shown in FIG. 1, and then dried.

The characteristic of the undercoating layer is shown in Table 2.

TABLE 2

| Undercoat Composition | A | B | C | D |
|---|---|---|---|---|
| (Characteristic of material) | $SO_3Na$ polyester | $SO_3Na$ polyester | $SO_3Na$ polyester | polyurethane polyisocyanate |
| Glass transition point $T_g$ | 70° C. | 55° C. | 32° C. | 35° C. |

The measurement of $T_g$ was made using a Reovibron made by Orienteck Co., Ltd. $T_g$ was changed by changes in molecular weight and functional group. In the measuring instrument, $T_g$ was measured as the maximum temperature obtained by measuring the dependency of loss elastic modulus upon temperature at a frequency of 110 Hz.

Results of coating were evaluated by visual observation after coating for 10 minutes (6000 m) in the aforementioned condition while varying the thickness of the undercoating layer. Further, lug adhesion was evaluated (Table 3) in the after-coating heat treating condition where the resulting medium was treated in a thermostatic chamber at 65° C. for 24 hours. Further, evaluation of adhesion (Table 4) was performed after the resulting medium was left at an ordinary temperature (25° C.) for 48 hours prior to the after-process. Furthermore, lug adhesion was evaluated (Table 5) in the after-coating heat treating condition where the resulting medium was treated in a thermostatic chamber at 60° C. for 24 hours, and lug adhesion was evaluated (Table 6) in the after-coating heat treating condition where the resulting medium was treated in a thermostatic chamber at 55° C. for 48 hours. The width of the exposed undercoating layer was 3 mm. The results of evaluation are shown in Tables 3, 4, 5 and 6.

TABLE 3

| Treatment at 65° C. for 24 hours | | |
|---|---|---|
| Undercoat Composition | Coating thickness | Lug adhesion |
| Composition A | 0.5 cc/m² | o |
| $T_g = 58$ to 65 | 1.0 cc/m² | o |
| | 2.0 cc/m² | o |
| Composition B | 0.5 cc/m² | o |
| $T_g = 55$ | 1.0 cc/m² | Δo |
| | 2.0 cc/m² | XΔ |
| Composition C | 0.5 cc/m² | o |
| $T_g = 32$ | 1.0 cc/m² | Δ |
| | 2.0 cc/m² | X |
| Composition D | 0.5 cc/m² | Δ |
| $T_g = 35$ | 1.0 cc/m² | X |
| | 2.0 cc/m² | X |

In the table, O represents a good result, Δ represents a result which is acceptable in practical use, and x represents a result which is not acceptable in practical use.

TABLE 4

| Treatment at 25° C. for 48 hours | | |
|---|---|---|
| Undercoat Composition | Applied Thickness | Lug adhesion |
| Composition A | 0.5 cc/m² | o |
| $T_g = 58$ to 65 | 1.0 cc/m² | o |
| | 2.0 cc/m² | o |
| Composition B | 0.5 cc/m² | o |
| $T_g = 55$ | 1.0 cc/m² | Δo |
| | 2.0 cc/m² | Δo |
| Composition C | 0.5 cc/m² | o |
| $T_g = 32$ | 1.0 cc/m² | ΔX |
| | 2.0 cc/m² | X |
| Composition D | 0.5 cc/m² | Δo |
| $T_g = 35$ | 1.0 cc/m² | X |
| | 2.0 cc/m² | X |

In the table, O represents a good result, Δ represents a result which is acceptable in practical use, and x represents a result which is not acceptable in practical use.

TABLE 5

| Treatment at 60° C. for 24 hours | | |
|---|---|---|
| Undercoat Composition | Coating thickness | Lug adhesion |
| Composition A | 0.5 cc/m² | o |
| $T_g = 58$ to 65 | 1.0 cc/m² | o |
| | 2.0 cc/m² | o |
| Composition B | 0.5 cc/m² | o |
| $T_g = 55$ | 1.0 cc/m² | o |
| | 2.0 cc/m² | Δ |
| Composition C | 0.5 cc/m² | o |
| $T_g = 32$ | 1.0 cc/m² | Δ |
| | 2.0 cc/m² | XΔ |
| Composition D | 0.5 cc/m² | Δ |

TABLE 5-continued

| Treatment at 60° C. for 24 hours | | |
|---|---|---|
| Undercoat Composition | Coating thickness | Lug adhesion |
| $T_g = 35$ | 1.0 cc/m² | XΔ |
| | 2.0 cc/m² | XX |

In the table, O represents a good result, Δ represents a result which is acceptable in practical use, and x represents a result which is not acceptable in practical use.

TABLE 6

| Treatment at 55° C. for 48 hours | | |
|---|---|---|
| Undercoat Composition | Coating thickness | Lug adhesion |
| Composition A | 0.5 cc/m² | o |
| $T_g = 58$ to 65 | 1.0 cc/m² | o |
| | 2.0 cc/m² | o |
| Composition B | 0.5 cc/m² | o |
| $T_g = 55$ | 1.0 cc/m² | o |
| | 2.0 cc/m² | Δ |
| Composition C | 0.5 cc/m² | o |
| $T_g = 32$ | 1.0 cc/m² | Δ |
| | 2.0 cc/m² | XΔ |
| Composition D | 0.5 cc/m² | Δ |
| $T_g = 35$ | 1.0 cc/m² | Δ |
| | 2.0 cc/m² | o |

In the table, O represents a good result, Δ represents a result which is acceptable in practical use, and x represents a result which is not acceptable in practical use.

It is apparent from Tables 3, 4, 5 and 6 that the difficulty of lug cutting and peeling in the after-process are eliminated, both at the time of heat treatment and under ordinary temperatures by determining the glass transition point ($T_g$) to be higher than the heat treatment temperature.

We claim:

1. A method for producing a magnetic recording medium having a protective undercoating layer and a magnetic layer on a continuously traveling flexible support, said method comprising the steps of:
   applying a high-molecular solution having a glass transition point ($T_g$) of higher than the heat treatment temperature onto at least edge portions of predetermined widths on both sides of continuously traveling flexible support;
   drying said high-molecular solution to form a first protective undercoating layer; and
   applying a magnetic coating composition onto a surface of said continuously traveling flexible support, excluding said at least edge portions, while pressing said continuously traveling flexible support against a forward end of a slot of a coating head, thereby to form a magnetic layer.

2. The method according to claim 1, further comprising the step of applying a second protective undercoating layer before applying said magnetic coating composition, wherein said first and second protective undercoating layers together are broader than said magnetic layer.

3. The method according to claim 2, wherein said second protective undercoating layer is formed of polyester resin.

4. The method according to claim 2, wherein said second protective undercoating layer is formed of polyurethane resin.

* * * * *